United States Patent
Choi et al.

(10) Patent No.: US 7,100,182 B2
(45) Date of Patent: Aug. 29, 2006

(54) DIGITAL VSB TRANSMISSION SYSTEM

(75) Inventors: In Hwan Choi, Seoul (KR); Young Mo Gu, Seoul (KR); Kyung Won Kang, Seoul (KR); Kook Yeon Kwak, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 999 days.

(21) Appl. No.: 09/991,581

(22) Filed: Nov. 16, 2001

(65) Prior Publication Data

US 2002/0186790 A1 Dec. 12, 2002

(30) Foreign Application Priority Data

Jun. 11, 2001 (KR) ............... 2001-32611

(51) Int. Cl.
*H04N 7/16* (2006.01)
(52) U.S. Cl. .................... 725/20; 375/240.01
(58) Field of Classification Search .................. 725/20; 375/240.01
See application file for complete search history.

(56) References Cited

U.S. PATENT DOCUMENTS

| | | |
|---|---|---|
| 5,087,975 A | 2/1992 | Citta et al. |
| 5,233,630 A | 8/1993 | Wolf |
| 5,488,691 A | 1/1996 | Fuoco et al. |
| 5,555,024 A | 9/1996 | Limberg et al. |
| 5,563,884 A | 10/1996 | Fimoff et al. |
| 5,583,889 A | 12/1996 | Citta et al. |
| 5,600,677 A | 2/1997 | Citta et al. |
| 5,602,595 A * | 2/1997 | Citta et al. .................. 348/495 |
| 5,629,958 A | 5/1997 | Wilming |
| 5,636,251 A | 6/1997 | Citta et al. |
| 5,636,252 A | 6/1997 | Patel et al. |
| 5,706,312 A | 1/1998 | Wei |
| 5,831,690 A | 11/1998 | Lyons et al. |
| 5,923,711 A | 7/1999 | Wilming |
| 5,946,047 A | 8/1999 | Levan |
| 6,075,569 A | 6/2000 | Lee et al. |
| 6,208,643 B1 | 3/2001 | Dieterich et al. |
| 6,490,002 B1 | 12/2002 | Shintani |
| 6,519,298 B1 | 2/2003 | Kim |

(Continued)

FOREIGN PATENT DOCUMENTS

KR 2000-0018531 A 4/1997

(Continued)

OTHER PUBLICATIONS

Gu, Y. -M., et. al. "Two -level Codes for Frequency/Phase Modulation" May 23, 1996, IEEE, Electronic Letters, vol. 32, Issue 11, pp. 987-988.*

(Continued)

*Primary Examiner*—Chris Kelley
*Assistant Examiner*—David O'Steen
(74) *Attorney, Agent, or Firm*—Lee, Hong, Degerman, Kang & Schmadeka

(57) ABSTRACT

A digital VSB transmission system that is able to send supplemental data along with MPEG image/sound data is enclosed. The system initially encodes the supplemental data symbol to generate a parity bit, and it multiplexes the parity bit with a predefined sequence and transmits the multiplexed data to a receiver. The system is compatible with the existing ATSC 8T-VSB receivers that are already on the market. It can have advantages over the other types of VSB transmission systems that transmit only the predefined sequence. In addition, the system according the to the present invention results an improved robustness against ghost and noise signals in a channel compared to systems using only the ½ rate convolutional encoding.

29 Claims, 10 Drawing Sheets

U.S. PATENT DOCUMENTS

| | | |
|---|---|---|
| 6,690,738 B1 | 2/2004 | Swenson et al. |
| 6,697,098 B1 | 2/2004 | Wang |
| 6,708,149 B1 | 3/2004 | Turin |
| 6,724,832 B1 | 4/2004 | Hershberger |
| 6,760,077 B1 | 7/2004 | Choi et al. |
| 6,763,025 B1 | 7/2004 | Leatherbury et al. |
| 6,788,710 B1 | 9/2004 | Knutson et al. |
| 2002/0085632 A1 | 7/2002 | Choi et al. |
| 2002/0181581 A1* | 12/2002 | Birru et al. ............ 375/240.01 |
| 2003/0021341 A1* | 1/2003 | Vigil et al. ............ 375/240.01 |
| 2004/0240590 A1 | 12/2004 | Cameron et al. |

FOREIGN PATENT DOCUMENTS

| | | |
|---|---|---|
| KR | 2000-0028757 A | 5/2000 |

OTHER PUBLICATIONS

U.S. Appl. No. 60/198,014, filed Apr. 18, 2000, Bretl et al.

* cited by examiner $g_i, h_i \in \{0,1\}, i=1...M-1$

DIGITAL VSB TRANSMISSION SYSTEM

This application claims the benefit of the Korean Application No. P2001-32611 filed on Jun. 11, 2001, which is hereby incorporated by reference.

BACKGROUND OF THE INVENTION

1. Field of the Invention

The present invention relates to a digital communication system, and more particularly, to a vestigial sideband (VSB) transmission system. Although the present invention is suitable for a wide scope of applications, it is particularly suitable for transmitting additional supplemental data while being compatible with the existing ATSC 8T-VSB receivers.

2. Discussion of the Related Art

The Advanced Television Systems Committee (ATSC) has selected the 8 Trellis-Vestigial Sideband (8T-VSB) modulation method as a standard in 1995 for the U.S. digital terrestrial television broadcasting, and the actual broadcasting incorporating the method has started since the second half of the year 1998. FIG. 1 illustrates an existing ATSC 8T-VSB transmitter according to the background art. It includes a data randomizer 1, a Read-Solomon encoder 2, a data interleaver 3, a trellis encoder 4, a multiplexer 5, a pilot inserter 6, a Vestigial Sideband (VSB) modulator 7, a radio frequency (RF) converter 8, and an antenna 9. Initially, the data randomizer 1 randomizes the input data received and outputs the randomized data to the Read-Solomon encoder 2. Then the Read-Solomon encoder 2 encodes (Read-Solomon encoding) the randomized data and adds a 20 bytes parity code. Next, the data interleaver 3 interleaves the data, and the trellis encoder 4 converts the interleaved data into symbols and performs the trellis encoding. After the multiplexer 5 multiplexes the trellis-encoded data and the sync signals, the pilot inserter 6 adds a pilot signal to the multiplexed symbols. Thereafter, the VSB modulator 7 modulates the symbols to 8T-VSB signals and outputs them to the RF converter 8. Finally, the RF converter 8 converts the 8T-VSB signals into RF signals, and the RF signals get transmitted to a receiving system.

FIG. 2 illustrates an existing ATSC 8T-VSB receiver according to the background art. It includes a demodulator 11, a comb filter 12, a slicer predictor 14, a channel equalizer 13, a phase tracker 15, a trellis decoder 16, a data deinterleaver 17, a Read-Solomon decoder 18, and a data derandomizer 19. Initially, the demodulator 11 converts the RF signals received through an antenna 10 into baseband signals. Then the comb filter 12 eliminates the interference signals from the signals, and the channel equalizer 13 compensates the distorted channels using the slicer predictor 14. Thereafter, the phase tracker 15 tracks the phases of the received signals, and the trellis decoder 16 decodes the phase tracked data in order for the symbol-byte converting. After the data deinterleaver 17 deinterleaves the signals received, the Read-Solomon decoder 18 decodes the Read-Solomon encoded signals. Finally, the derandomizer 19 derandomizes the decoded signals.

It is very important to note that the existing ATSC 8T-VSB receiver is able to receive only MPEG (Moving Picture Experts Group) data, but not any other supplemental data such as program execution files or certificate information. In other words, the existing ATSC 8T-VSB transmitter and receiver are only for MPEG image or sound data. In order to satisfy various demands of many users (viewers), the system should be able to send or receive the supplemental information as well as the image/sound data through digital broadcasting channels.

In addition, it is expected that some of the users will have to use a portable device or a personal computer (PC) card attached with a simple antenna in order to receive the supplemental data. In a case when a system receives data in a room, the data reception performance is generally poor due to the noises and ghosts resulted from reflected waves and many other factors. It is important to note that the supplemental data transmission must have a lower error rate compared to the image/sound data transmission. That's because even one bit error in the supplemental data transmission can create a very serious problem. Therefore, the system must be able to overcome the ghosts and noises generated in the channel.

Normally, the supplemental data will be transmitted together with the MPEG image/sound data using a time-sharing method. However, many ATSC VSB digital broadcasting receivers that can receive only the MPEG data are already on the market. Therefore, the supplemental data being transmitted with the MPEG data should not have any effect on the existing receivers for properly receiving the MPEG data. In other words, the supplemental data transmission system should be compatible with the existing ATSC VSB receivers.

SUMMARY OF THE INVENTION

Accordingly, the present invention is directed to a digital VSB transmission system that substantially obviates one or more problems due to limitations and disadvantages of the related art.

An object of the present invention is to provide a digital VSB transmission system that is able to send MPEG image/sound data together with supplemental data and is still compatible with the existing ATSC 8T-VSB receivers.

Another object of the present invention is to provide a digital VSB transmission system enabling the supplemental data to bypass a precoder of the VSB transmitter in order to have a higher robustness against the noise and ghost signals.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital VSB transmission system includes: a supplemental data processor receiving input supplemental data and inserting systematic Read-Solomon parity bytes, a first predefined sequence, and an MPEG header into the input supplemental data; a first multiplexer multiplexing MPEG data with the input supplemental data processed in the supplemental data processor to generate a set of data segments, each of which is any one of a supplemental data segment and an MPEG data segment; and a first encoding part generating a supplemental data symbol for each supplemental data segment by initially inserting 20 place holder bytes for the ATSC RS parity in a way that after data interleaving, the 20 place holder bytes for the RS parity that are associated with a given supplemental data segment, although scattered with the data stream, exit the interleaver after all 187 data/header bytes for that segment have exited the interleaver.

The system further includes: a supplemental data symbol processor generating first and second data bits for each supplemental data symbol, the first data bit being generated by encoding an information bit of each supplemental data symbol with a modified precoder and a post decoder, the second data bit being generated by encoding the information bit with a ½ coding rate and multiplexing the encoded parity bit with the first predefined sequence; and a VSB transmitter processing the data bits generated in the supplemental data symbol processor including trellis encoding and VSB modulating and subsequently transmitting the modulated data to a receiving side.

The first encoding part included in the system includes: a data randomizer randomizing each supplemental data segment generated in the first multiplexer; a parity place holder inserter determining a parity place holder and inserting null bytes into parity places determined by the holder for each supplemental data segment randomized in the data randomizer; a data interleaver interleaving the each supplemental data segment processed in the parity place holder inserter so that the parity place holder bytes exit after the information bytes at the output of the interleaver; and a parity substituting part substituting the parity place holder bytes with nonsystematic parity bytes for each supplemental data segment interleaved in the data interleaver.

The first encoding part further includes: a byte-symbol converter converting each byte processed in the parity substituting part into four data symbols; a symbol-byte converter converting the output symbol of the supplemental data symbol processor into corresponding bytes; and a nonsystematic Read-Solomon encoder performing a nonsystematic Read-Solomon encoding process on the data converted in the symbol-byte converter in order to provide the nonsystematic parity bytes to the parity substituting part for each supplemental data segment.

The supplemental data processor included in the VSB transmission system according to the present invention includes: a precoder-bypassing part which consists of a modified precoder and a post decoder to generate the first data bit; a ½ rate convolutional encoder encoding the information bit of each supplemental data symbol with the ½ coding rate; and a second multiplexer multiplexing the encoded parity bit of each supplemental data symbol with the first predefined sequence to generate the second data bit.

The precoder-bypassing part of the supplemental data processor includes: a modified precoder having a second precoder and enabling the information bit of each supplemental data symbol to bypass the second precoder; and a post-decoder post-decoding the output bit of the modified precoder.

The convolutional encoder of the supplemental data symbol processor includes: a first selecting element selecting a previous second register value for each supplemental data symbol; a first register storing the value selected by the first selecting element; an adder adding the value stored in the first register and the information bit of each supplemental data symbol; a second selecting element selecting the value added by the adder for each supplemental data symbol; a second register storing the value selected by the second selecting element; and a third selecting element selecting the value stored in the second register for each supplemental data symbol, wherein the previous second register value is a value previously stored in the second register.

In another aspect of the present invention, a digital VSB transmission system includes: a precoder-bypassing part generating a first data bit by a modified precoder and a post decoder; a ½ rate convolutional encoder encoding the information bit of a supplemental data symbol with a ½ coding rate; a multiplexer selecting the encoded parity bit as a second data bit; a first precoder generating a third data bit by preceding the first data bit; a trellis encoder generating a fourth data bit by directly outputting the second data bit and generating a fifth data bit by trellis-encoding the second data bit; and a VSB modulator generating a modulation value based on the third, fourth, and fifth data bits received from the first precoder and trellis encoder.

The precoder-bypassing part includes a modified precoder and a post decoder and enabling the information bit of the supplemental data symbol to bypass the precoder; and enabling the ATSC normal data symbol to be precoded.

The ½ rate convolutional encoder includes: a first selecting element selecting a previous second register value for the supplemental data symbol received; a first register storing the value selected by the first selecting element; an adder adding the value stored in the first register and the information bit of the supplemental data symbol; a second selecting element selecting the value added by the adder; a second register storing the value selected by the second selecting element; and a third selecting element selecting the value stored in the second register; wherein the previous second register value is a value previously stored in the second register.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
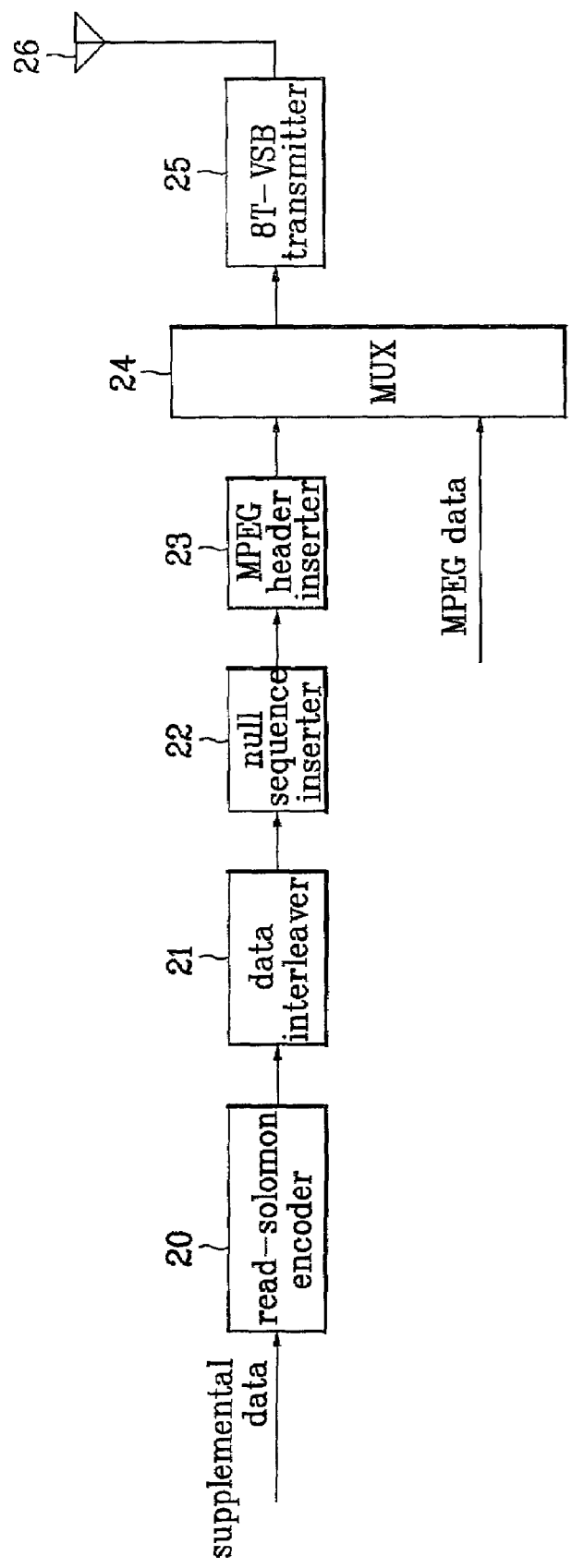
FIGS. 3 illustrates a digital VSB transmission system according to the present invention.

FIG. 3 illustrates a basic digital VSB transmission system according to the present invention. While being compatible with the existing ATSC 8T-VSB receivers, this system is able to send supplemental data together with the MPEG image/sound data. As shown in FIG. 3, the Read-Solomon encoder 20, data interleaver 21, null sequence inserter 22, and MPEG header inserter 23 of the system perform necessary processes on the supplemental data in order to make their structure identical to the MPEG transport packets. In order to achieve that, the Read-Solomon encoder 20 initially encodes the input supplemental data to add a 20 bytes parity code, and subsequently, the data interleaver (21) interleaves the encoded data to increase the robustness against burst noise signals. Thereafter, the null sequence inserter 22 inserts a null sequence to the interleaved data in order for a data receiver to receive the data properly even in a poor channel environment.

Figure 1:
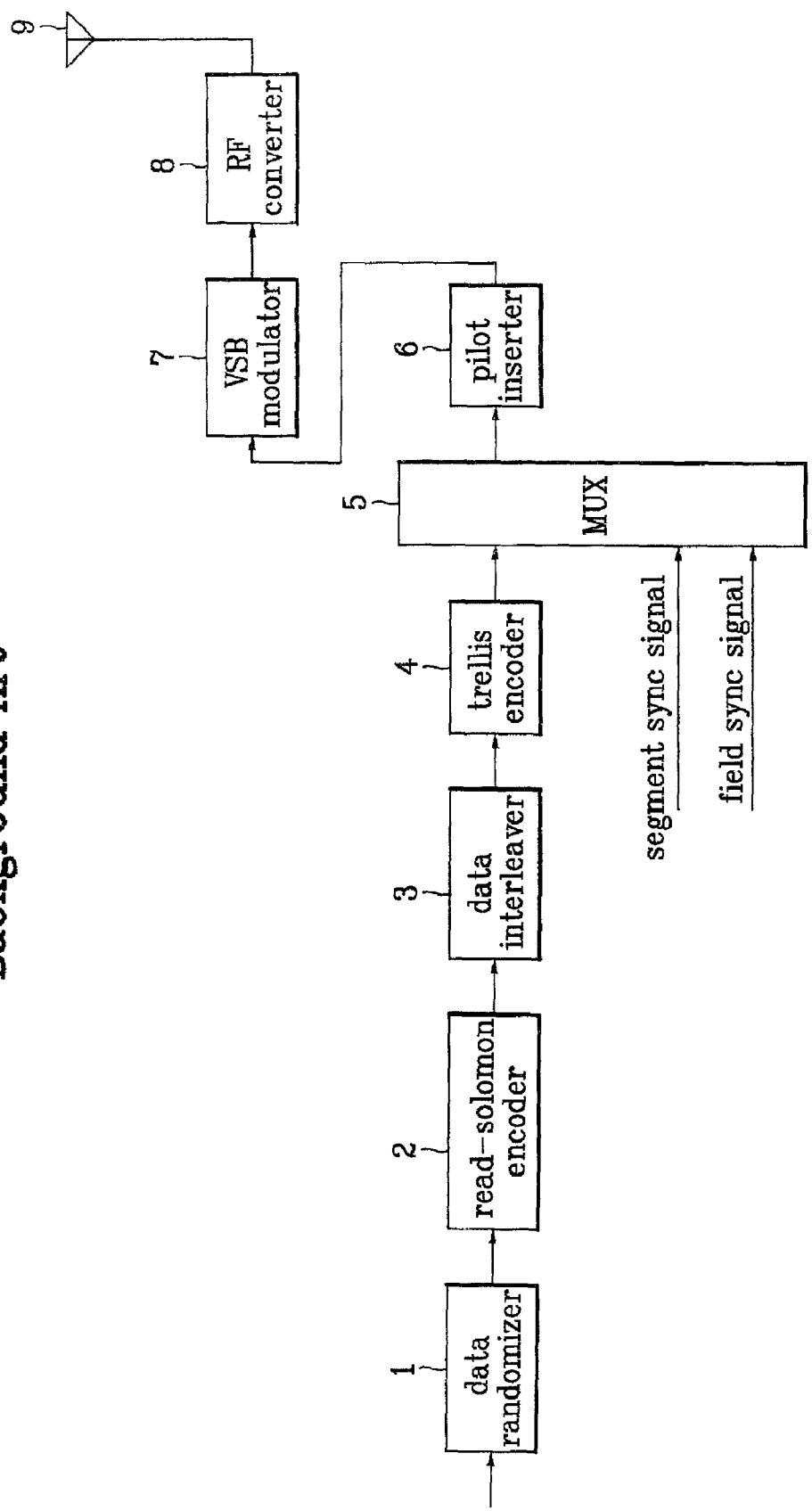
FIG. 1 illustrates an existing ATSC 8T-VSB transmitter according to the background art.
Figure 2:
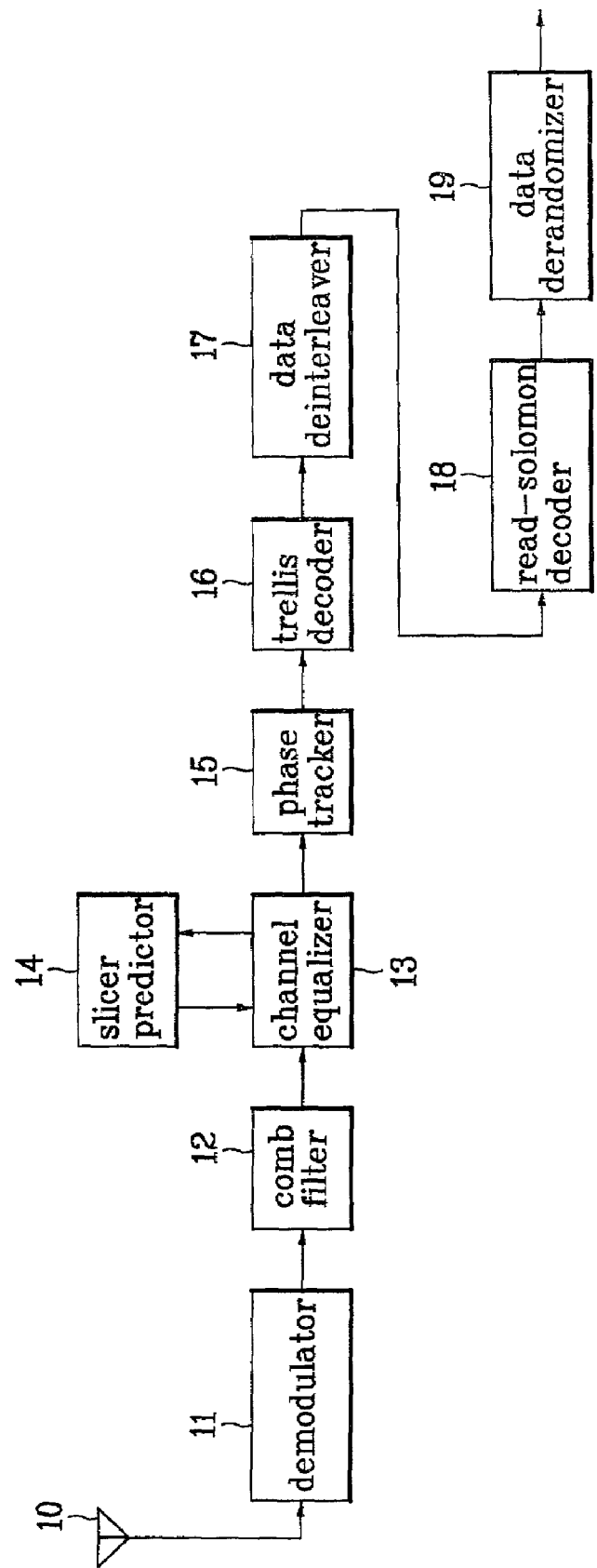
FIG. 2 illustrates an existing ATSC 8T-VSB receiver according to the background art.

After the null sequence inserter 22 inserts each null bit, the MPEG header inserter 23 inserts a 3 bytes MPEG header so that the format of the supplemental data becomes identical to that of the MPEG transport packets. Thereafter, the multiplexer 24 multiplexes (time-division) the supplemental data with the MPEG image/sound data and outputs the multiplexed data to the existing 8T-VSB transmitter 25. The detailed structure of the existing 8T-VSB transmitter 25 is shown in FIG. 1.

Namely, the 164 bytes of the supplemental data packets become 184 bytes of data packets after being encoded in the Read-Solomon encoder 20 and become two sets of 184 bytes packets after being processed in the data interleaver 21 and the null sequence inserter 22. Thereafter, after the 3 bytes MPEG transport header is added in the MPEG header inserter 23, two sets of 187 bytes packets are output to the multiplexer 24. The multiplexer multiplexes the two sets of the supplemental data with the MPEG transport packets in segment units, and finally, the 8T-VSB transmitter 25 transmits the multiplexed data to the receiver.

The null bits added to the supplemental data go through the processes including the randomizing and Read-Solomon encoding in the 8T-VSB transmitter 25. Then the null bits of the encoded supplemental data are inputted (as d0) to a trellis encoder of the transmitter 25. In addition, an information bit of the encoded supplemental data is inputted (as d1) to the trellis encoder. d0 and d1 correspond to a lower and higher input bits, respectively. The line of the bits being inputted as d0 to the trellis encoder will be called as a predefined sequence for the convenience.

In other words, after the null bits are converted to the predefined sequence, the trellis encoder inputs the predefined sequence as d0. Then the VSB receiver regenerates a predefined sequence in order to improve the performances of the channel equalizer, the slicer predictor and/or the trellis decoder.

Figure 4:
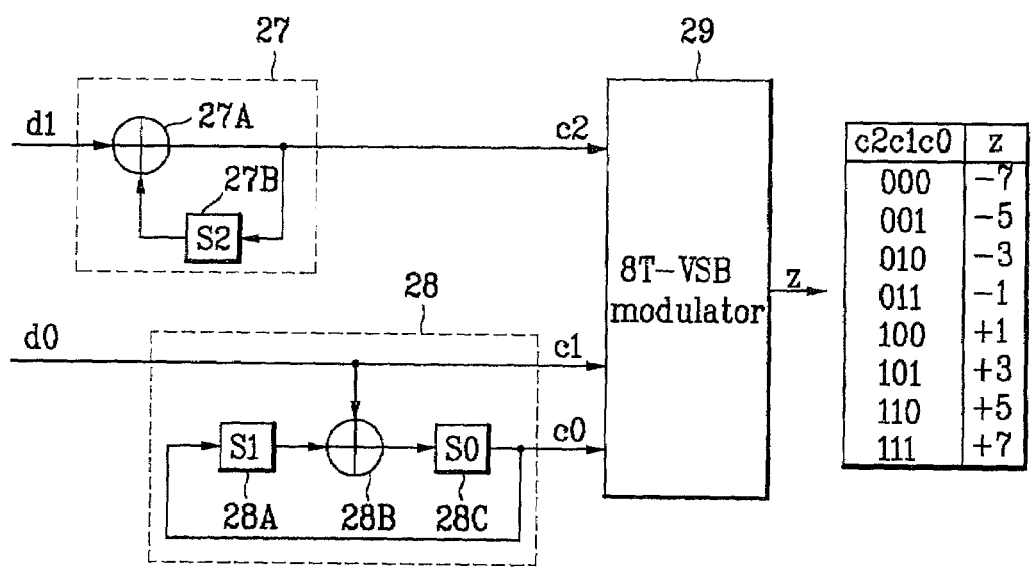
FIG. 4 illustrates a trellis-encoder and a precoder included in the existing ATSC 8T-VSB transmitter shown in FIG. 6.

FIG. 4 illustrates a trellis encoder and a precoder used in the ATSC 8T-VSB transmitter 25 shown in FIG. 3. The trellis encoder 28 and the precoder 27 encode the input bits d0 and d1, respectively, and they generate the output bits c0, c1, and c2. The 8T-VSB modulator 29 generates an 8 level modulation value (z) corresponding to the output bits received. 27A and 28B represent adders, and 27B, 28A, and 28C represent registers. In addition, the trellis encoder 28 and the precoder 27 together are often called as a trellis encoder.

As shown in FIG. 4, the precoder 27 precodes the higher input bit d1 and generates c2, and the lower input bit d0 becomes c1. However, the value of the output bit c0 depends on the value stored in the register 28A. The VSB modulator 29 determines the modulation level z based on c0, c1 and c2. After the supplemental data and the MPEG data are sent, the existing 8T VSB receiver receives only the MPEG transport packets using the packet identification (PID) given by the transport packet header, and the receiver discards the supplemental data. On the other hand, the receivers being able to receive the supplemental data demultiplexes the multiplexed data using appropriate information, and they perform further necessary processes on the supplemental data.

According to the present invention, instead of transmitting the predefined sequence included in the supplemental data symbol as shown in FIG. 4, the system multiplexes the predefined sequence of the supplemental data symbol with a parity bit generated by encoding the supplemental data symbol, and it transmits the multiplexed data. Therefore, the system can maintain its ghost/noise eliminating capability and still have a greater encoding gain. In order to maintain the transmission rate of the supplemental data, a puncturing code is used instead of a ½ rate code. These are shown in FIG. 5.

Figure 5:
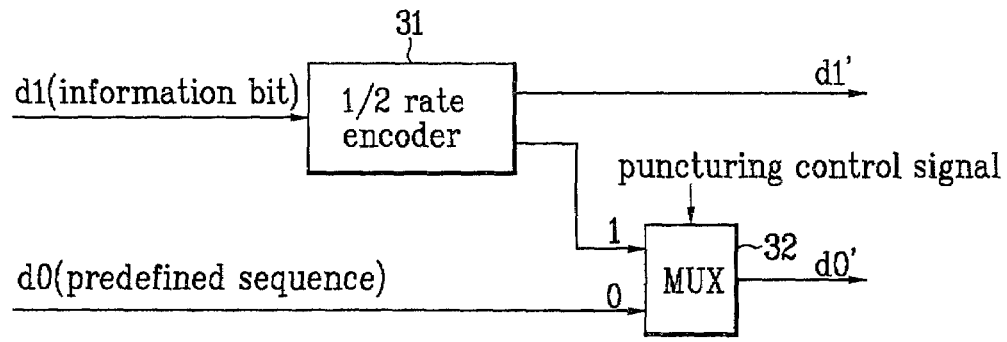
FIG. 5 illustrates a ½ rate convolutional encoder and a multiplexer used in the digital VSB transmission system according to the present invention.

FIG. 5 illustrates a ½ rate convolutional encoder and a multiplexer of a first embodiment of the digital VSB transmission system according to the present invention. As shown in the figure, the system includes a ½ rate encoder 31, a multiplexer 32. A supplemental data symbol includes an information bit d1 and a predefined sequence d0. Initially, d1 and d0 are inputted to the ½ rate encoder 31 and the multiplexer 32, respectively. Then the ½ rate encoder 31 outputs d1 as d1', encodes d1 using a ½ coding rate in order to create a parity bit, and outputs the party bit to the multiplexer 32. Then the multiplexer 32 selects one of the parity bit and the predefined sequence based on the puncturing control signal received and outputs the selected data as d0'.

The puncturing control signal is a control signal corresponding to the supplemental data only. A fixed pattern is repeated to form a puncturing control signal. For example, in a case where "10" is repeated in the signal, the multiplexer 32 outputs the parity bit and the predefined sequence alternatively. In this case, the coding rate becomes ⅔ since there are two input bits and three output bits. On the other hand, if "100" is repeated, the multiplexer 32 outputs the parity bit once and subsequently outputs the predefined sequence twice. Therefore, the corresponding coding rate becomes ¾.

The value and the length of the puncturing pattern can be determined arbitrarily. If the puncturing pattern includes only "1", then the puncturing control signal also includes only "1". Therefore, the multiplexer 32 always outputs the parity bit to the trellis encoder 34. None of the predefined sequence gets transmitted in this case. On the other hand, if the puncturing pattern includes only "0", then the multiplexer 32 outputs only the predefined sequence. As it is shown, the present invention can be used as several different types of system.

In addition, the trellis encoder 28 encodes the parity bit generated by encoding the information bit d1 in the ½ rate encoder 31. Therefore, it is preferable to use a convolutional encoder having a feedback structure for the ½ rate encoder 31.

Figure 6:
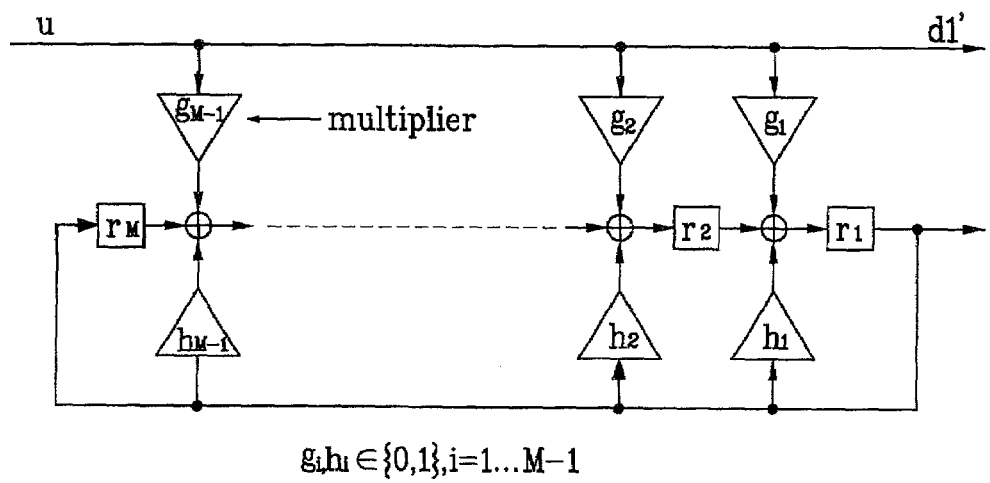
FIG. 6 illustrates a general ½ rate convolutional encoder used in the digital VSB transmission system according to the present invention.

FIG. 6 illustrates a general structure of a ½ rate convolutional encoder used in the digital VSB transmission system according to the present invention. As it is shown in the figure, an information bit u becomes an output bit d1', and the value stored in the register r1 becomes a parity bit. The encoder includes a first set of multipliers where an i th multiplier multiplies the value stored in the register r1 with a given constant $h_i$; a second set of multipliers where an i th multiplier multiplies the input information bit u with a given constant $g_i$; a set of adders where an i th adder adds the outputs from the corresponding multipliers and $r_{i+1}$ for i=1,2,3, . . . , M−1; and a set of registers $r_1, r_2, \ldots, r_M$ where an i th register $r_i$ stores the value calculated by the i th adder for i=1,2,3, . . . , M−1, an M th register $r_M$ stores a previous first register value. The values of the given constants are such that $g_i, h_i \in \{0,1\}$, and i=1,2, . . . , M−1.

Figure 7A:
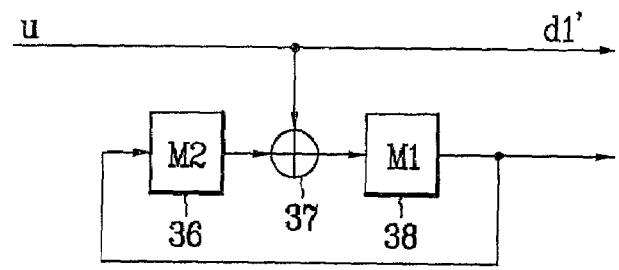
FIGS. 7A, 7B, and 7C illustrate different types of the ½ rate convolutional encoder of FIG. 6 having two, three, and four registers respectively.
Figure 7B:
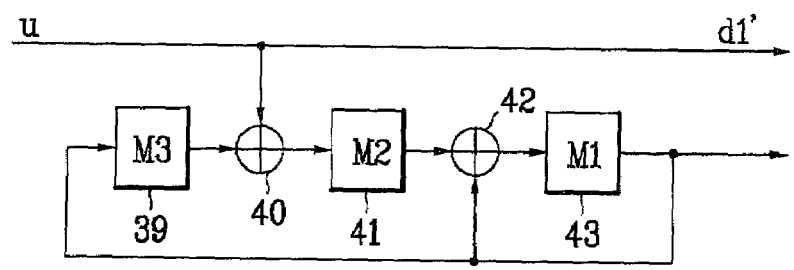
Figure 7C:
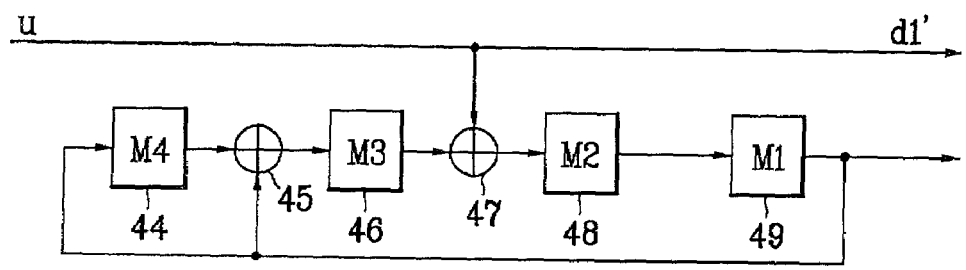

FIGS. 7A, 7B, and 7C illustrate several examples of the general structure of a ½ rate systematic and feedback type convolutional encoder used in the digital VSB transmission system according to the present invention. The convolutional encoder shown in FIG. 7A includes a first register M2 36 storing a previous register value, an adder 37 adding the value stored in M2 36 and the information bit u, a second register M1 38 storing the added value and outputting the stored value which is the parity bit.

FIG. 7B shows a second example of the convolutional encoder according to the present invention. Similarly, the encoder includes a first register M3 39 storing a previous third register value, a first adder 40 adding the value stored in M3 and the information bit u, a register M2 41 storing the value added in the first adder 40, a second adder 42 adding the value stored in the register M2 41 and the previous third register value, and a third register M1 43 storing the value of the second adder 42 and outputting the stored value which is also the parity bit.

FIG. 7C shows another example of the convolutional encoder according to the present invention. The encoder includes a register M4 44 storing d0', a first adder 45 adding the value stored in the register M4 44 and d0', a register M3 46 storing the value of the first adder 45, a second adder 47 adding the value stored in the register M3 46 and the information bit u, a register M2 48 storing the value of the second adder 47, a register M1 49 storing the value stored in the register M3 46 and outputting the stored value.

Figure 8:
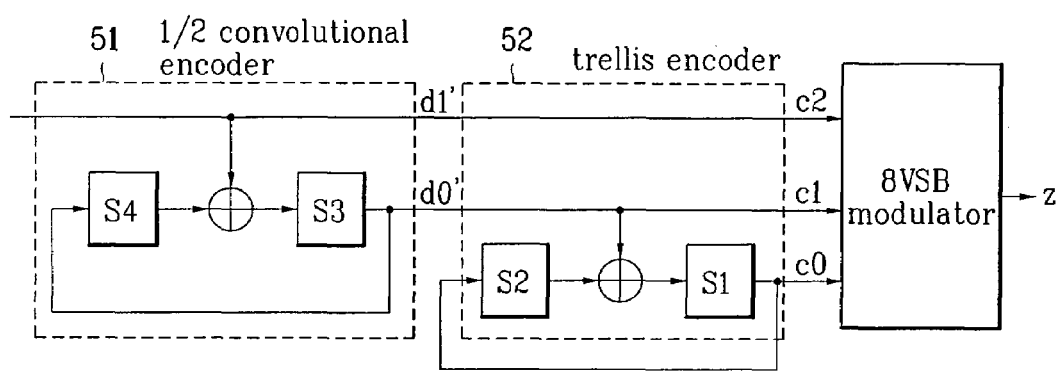
FIG. 8 illustrates a supplemental data symbol processor used in the digital VSB transmission system according to the present invention.

When a supplemental data symbol bypasses the precoder of the trellis encoder used in the VSB system, the positive effect of the ½ rate convolutional encoding will be even greater. FIG. 8 illustrates a ½ convolutional encoder 51 and a trellis encoder 52 of the digital VSB transmission system. As it is shown in the figure, the supplemental data are bypassing the precoder. However, in order for the existing 8T-ATSC receiver to properly receive the MPEG data packets multiplexed with the supplemental data packets, data symbols other than the supplemental data symbol must be processed in the precoder. This problem can be solved using the modified precoder of the VSB transmission system shown in FIG. 9.

Figure 9:
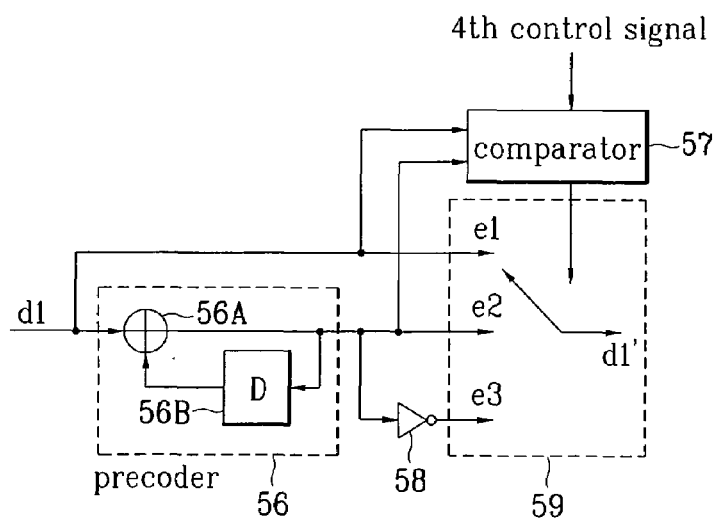
FIG. 9 illustrates a modified precoder of a precoder-bypassing part used in the digital VSB transmission system according to the present invention.

FIG. 9 includes a precoder 56 preceding an input bit d1 to generate a precoded bit e2; an inverter 58 inverting the precoded bit e2 to generate an inverted bit e3; a switching element 59 outputting one of the e1 (bypassed bit), e2, and e3 as an output bit d1' based on a selecting signal; and a comparator 57 receiving e1, e2, and a fourth control signal and generating the selecting signal to the switching element 59. If the input bit d1 is a supplemental data symbol, the comparator 57 receives a fourth control signal, which is a supplemental data symbol indicating signal. Then it generates a corresponding selecting signal and transmits it to the switching element 59 so that the switching element 59 outputs e1. In other words, if d1 is a supplemental data symbol, the system shown in FIG. 9 outputs the bypassed bit e1. In addition, e2 and e3 are still generated even if d1 is not a supplemental data symbol.

On the other hand, if the input bit d1 is a data symbol other than a supplemental data symbol, the fourth control signal will not be provided to the comparator 57. In this case, the comparator 57 generates a corresponding selecting signal by comparing e1 with e2 at the last supplemental data symbol. If both of e1 and e2 had a same value at the last supplemental symbol, the switching element 59 outputs e2 based on the selecting signal provided by the comparator 57. Otherwise, the switching element 59 outputs e3.

Using the modified precoder shown in FIG. 9, the existing 8T-VSB receivers are able to properly receive the MPEG transport packets multiplexed with the supplemental data packets. However, since the ½ rate convolutional encoding process is performed after the Read-Solomon encoding process for each supplemental data symbol, the existing ATSC 8T-VSB receiver on the market is not able to decode the Read-Solomon code properly.

For this reason, the parity of the Read-Solomon code corresponding to the supplemental data segment must be regenerated after performing the post decoding on the output of the supplemental data symbol processor. In addition, in a case where the input data symbol is a MPEG image/sound data symbol, the values stored in the registers of the convolution encoder must not be affected by the input data symbol d1. In other words, the convolutional encoder must encode only the supplemental data symbol including a null bit. If the input data symbol is not the supplemental data symbol, the registers of the convolutional encoder must maintain their values by storing their previous values.

Therefore, the ½ rate convolutional encoder concatenated to the trellis encoder in a VSB transmission system should be a selective convolutional encoder that operates depending on whether the input data symbol is a supplemental data symbol. If an input symbol is a supplemental data symbol including a predefined sequence, an information bit and the predefined sequence of the input symbol become d1 and d0 respectively. In addition, the information bit is inputted to the trellis encoder as d1', and a parity bit generated by encoding the information bit is multiplexed with the predefined sequence based on a puncturing control signal. Then the multiplexed data are inputted to the trellis encoder as d0'.

Figure 10:
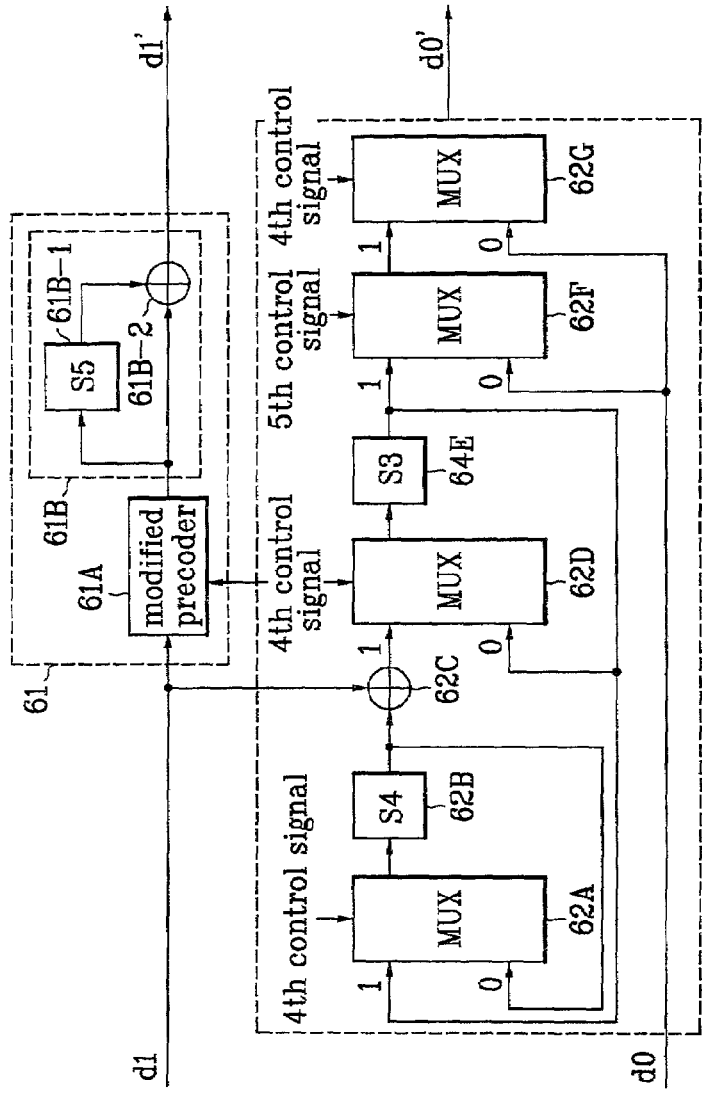
FIG. 10 illustrates a supplemental data symbol processor used in the digital VSB transmission system according to the present invention.

FIG. 10 illustrates a precoder-bypassing part 61 and a ½ rate convolutional encoder 62 concatenated to a trellis encoder of a digital VSB transmission system according to the present invention. The ½ rate convolutional encoder 62 has two registers as shown in FIG. 7A, and the precoder-bypassing part 61 includes a modified precoder 61A and a post decoder 61B. In addition, the ½ rate convolutional encoder 62 combined with the precoder-bypassing part 61 is often called as a supplemental data symbol processor. The modified precoder 61A of the precoder-bypassing part 61 is shown in FIG. 9.

When a supplemental data symbol is received as an input data symbol, an information bit d1 of the supplemental data symbol bypasses the precoder included in the modified precoder 61A and is decoded in the post decoder 61B. Thereafter, the precoder 63 of the existing transmitter precodes the post-decoded data. Therefore, the output c2 generated from the precoder 63 is identical to the information bit d1. In addition, the ½ rate convolutional encoder 62 convolutionally encodes d1 and multiplexes the encoded data with a predefined sequence d0. Then the trellis encoder 64 inputs the multiplexed data.

In the other case where a data symbol other than a supplemental data symbol is received as an input data symbol, the modified precoder 61A outputs the precoded bit or its inverted bit depending on the result of the last supplemental data symbol as d1, and the post decoder 61B decodes the output of the modified precoder. Thereafter, the precoder 63 precodes the decoded data. In addition, d0 bypasses the convolutional encoder 64 and gets inputted to the trellis encoder 64 as d0'.

The ½ rate convolutional encoder 62 shown in FIG. 10 has the structure shown in FIG. 7A, but it further includes several multiplexers. It includes a first multiplexer 62A outputting a first or second feedback values based on a fourth control signal; a first register S4 62B storing the value outputted from the first multiplexer 62A; an adder 62C adding d1 with the value stored in the first register S4; a second multiplexer 62D outputting the value added in the adder 62C or the second feedback value based on the fourth control signal; a second register S3 62E temporarily storing the value outputted from the second multiplexer 62D; a third multiplexer 62F outputting the value stored in the register S3 or d0 based on the fifth control signal; and a fourth multiplexer 62G outputting the value output from the third multiplexer 62F or d0 based on the fourth control signal.

The first and second feedback values are the values that were previously stored in the first and second registers when a previous input bit was processed. Similarly, the values being stored in the first and second registers 62B 62E will be used when the supplemental data processor receives a next input bit.

The fourth control signal is a supplemental data symbol indicating signal that indicates whether the input symbol is a supplemental data symbol. For example, let's assume that the fourth control signal includes "1" if the input symbol is a supplemental data symbol or includes "0" otherwise. If the fourth control signal includes "1", the first multiplexer 62A outputs the second feedback value, which is the value lastly stored in the second register 64E. Otherwise, it outputs the first feedback value, which is the value lastly stored in the first register 62B. Similarly, the second multiplexer 62D outputs the value added in the adder 62C if the fourth control signal includes "1" or otherwise outputs the second feedback value to the second register 64E. The fourth multiplexer 62G outputs the value outputted from the third multiplexer 62F if the fourth control signal includes "1" and otherwise outputs the lower input bit d0 to the trellis encoder 64.

The fifth control signal shown in FIG. 10 is identical to the puncturing control signal shown in FIG. 5. The third multiplexer 62F outputs the parity bit, which is the value stored in the second register 62E, if the fifth control signal includes "1". Otherwise, it outputs the predefined sequence d0 to the fourth multiplexer 62G. In addition, there are a total of fifteen supplemental data processing parts, each being concatenated to each trellis encoder of the ATSC 8T-VSB system.

As mentioned earlier, in order for the Read-Solomon decoder of the existing ATSC 8T-VSB receiver to avoid any error in its supplemental data segment, the parity byte corresponding to the output of the supplemental data symbol processing part must be transmitted to the receiving side. When transmitting the parity byte, the compatibility requirement of the system with the existing receiver and the precoder-bypassing requirement of the supplemental data symbol must be satisfied.

Therefore, according to the present invention, the 20 Read-Solomon parity bytes are outputted after 187 information bytes in the data interleaver, and the initially calculated Read-Solomon parity bytes are replaced with the recalculated Read-Solomon parity bytes. The nonsystematic Read-Solomon encoder encodes the data which bypassed the precoder and convolutionally encoded in the supplemental data symbol processor to generate the new Read-Solomon parity bytes. Then the parity substituting part substitutes the new Read-Solomon parity bytes for the initially calculated Read-Solomon parity bytes.

Namely, the Read-Solomon encoder of the ATSC 8T-VSB transmitter shown in FIG. 1 is a systematic encoder. This means that the 20 party bytes are outputted after the 187 information bytes. In general, a Read-Solomon code is a linear block code. Therefore, the Read-Solomon code can be encoded with a linearly transformed generator matrix because the set of code-words is still the same. Then the non-systematic Read-Solomon encoded code-words can be decoded with a systematic Read-Solomon decoder. In other words, the encoding process can be performed in a way that the parity bytes are placed in arbitrary positions in the codeword.

Figure 11:
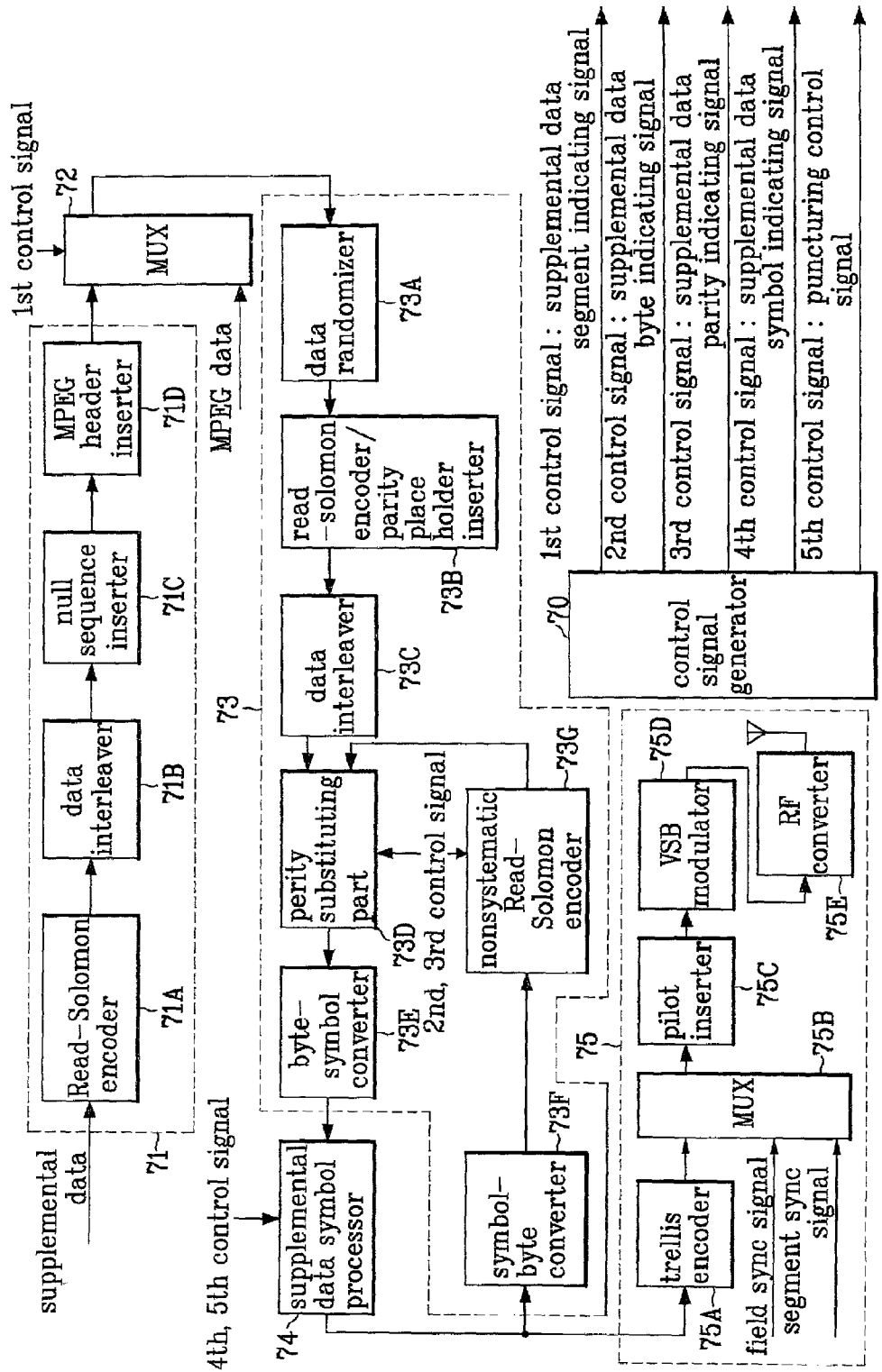
FIG. 11 illustrates a digital VSB transmission system according to the present invention, which includes the supplemental data processor shown in FIG. 10.

FIG. 11 illustrates a digital VSB transmission system according to the present invention. The system shown in FIG. 11 includes a supplemental data processor 71 performing the Read-Solomon encoding, null sequence inserting, and MPEG header inserting processes on the input supplemental data; a multiplexer 72 outputting the supplemental data packets received from the supplemental data processor 71 or the MPEG data packets; and a first encoding part 73 outputting 20 Read-Solomon parity bytes after outputting 187 information bytes and replacing the parity bytes with the recalculated nonsystematic Read-Solomon parity bytes for the supplemental data segments.

The system further includes a supplemental data symbol processor 74 encoding the supplemental data and outputting the encoded data or the predefined sequence based on the fifth control signal; and an existing 8T-VSB transmitter 75 performing processes on the data output from the supplemental data symbol processor 74 including the trellis encoding and VSB modulating and transmitting the data to a VSB receiver.

The first encoding part 73 of the VSB transmission system includes a data randomizer 73A randomizing the data outputted from the multiplexer 72; a Read-Solomon encoder or parity place holder inserter 73B inserting 20 null bytes in a way that the parity bytes exit the interleaver after 187 information bytes if the randomized data are supplemental data or otherwise performing the systematic Read-Solomon encoding; a data interleaver 73C interleaving the data output from the Read-Solomon encoder/party place holder inserter 73B; a parity substituting part 73D substituting the parity bytes generated from the nonsystematic Read-Solomon encoding for the parity place holders of the supplemental data segments outputted from the data interleaver 73C; a byte-symbol converter 73F converting the data output from the parity substituting part 73D into corresponding symbols; a symbol-byte converter 73F converting (symbol to byte) the data output from the supplemental data symbol processor 74; and a nonsystematic Read-Solomon encoder 73G calculating parity bytes for the supplemental data segments by performing the Read-Solomon encoding on the data outputted from the symbol-byte converter 73F based on second and third control signals and outputting the parity bytes to the parity substituting part 73C.

As it is shown in FIG. 11, the control signal generator 70 generates necessary control signals and provides each signal to each part of the system. The first control, which is used in the first encoding part 73 and the Read-Solomon encoder/parity place holder inserter 73B, is a supplemental data segment indicating signal. Namely, the first control signal is generated based on a field-synchronizing signal. Next, the second and third control signals, which are used in the parity substituting part 73D and the nonsystematic Read-Solomon encoder 73G, are a supplemental data byte indicating signal and a supplemental data parity indicating signal, respectively. Lastly, the fourth control signal used in the supplemental data symbol processor 74 is a supplemental data symbol indicating signal.

Reference will now be made in detail to the functional processes of each part of the digital VSB transmission system, which are illustrated in FIG. 11. After being processed in the Read-Solomon encoder 71A, data interleaver 71B, null sequence inserter 71C, and MEPG header inserter 71D of the supplemental data processor 71, the input supplemental data become supplemental data packets including a systematic Read-Solomon parity (20 bytes), a null sequence, and an MPEG header. Then the multiplexer 72 outputs the supplemental data packets or MEPG image/sound data packets to the first encoding part 73 based on the first control signal, which is a supplemental data segment indicating signal.

Initially, the data randomizer 73A of the first encoding part 73 randomizes the supplemental data segments multiplexed with the MPEG transport segments in the multiplexer 72 and outputs the randomized data to the Read-Solomon encoder/parity place holder inserter 73B.

Then the Read-Solomon encoder/parity place holder inserter 73B performs the systematic Read-Solomon encoding or parity place holder inserting process based on the first control signal. That is, it performs the systematic Read-Solomon encoding process if the segments outputted from the data randomizer 73A are MEPG transport segments. On the other hand, if the segments are supplemental data segments, it performs the necessary processes enabling the data interleaver 73C to output 187 information bytes first and subsequently 20 parity bytes. The system determines the desired locations of the parity bytes, and inserts the null bytes in the determined locations. Then it puts 187 information bytes in all other locations in order. Initially, the values of the null bytes can be arbitrarily chosen, and they will be replaced with the parity bytes calculated in the nonsystematic Read-Solomon encoder later on. Therefore, the object of the null bytes is to hold the places of the parity bytes of the nonsystematic Read-Solomon encoder.

An ATSC 8T-VSB data field includes a field sync segment and 312 data segments. Therefore, the locations of the parity bytes, in which the null bytes are inserted, are different for each segment, and the locations are determined by using the following equation.

$$b=((52 \times p)+(s \bmod 52)) \bmod 207, \ p=187,188,\ldots,206. \quad \text{[Equation 1]}$$

In Equation 1, s represents a segment number of a segment subsequent to the field sync signal and has a value from 0 to 311. b represents the location of a byte in a segment and has a value from 0 to 206. In addition, the number 52 is a constant number determined by the data interleaver 73C. When the location of a segment is determined, a corresponding parity place holder can be determined.

However, when at least one of a parity place holder corresponds to first three bytes of a segment, few problems will rise. This is because the first three bytes of each segment represent an MPEG transport header. Such segments are s=1, 2, 3, 4, 5, 6, 7, 53, 54, 55, 56, 57, 58, 59, 105, 106, 107, 108, 109, 110, 111, 157, 158, 159, 160, 161, 162, 163, 209, 210, 211, 212, 213, 214, 215, 261, 262, 263, 264, 265, 266, and 267. Therefore, it is desirable not to insert any supplemental data using these segment locations.

In addition, since the determined parity place holder is different for each segment, the nonsystematic encoder 73G should have a corresponding generator matrix.

The data interleaver 73C interleaves the data outputted from the Read-Solomon encoder/parity place holder inserter 73B.

Thereafter, the parity substituting part 73D substitutes the parity bytes generated from the nonsystematic Read-Solomon encoder 73G for the parity place holder inserted to each supplemental data segment and outputs the data to the byte-symbol converter 73E based on the second and third control signals, which correspond to a supplemental data byte indicating signal and a supplemental data parity indicating signal, respectively. If the data inputted to the parity substituting part 73D are MPEG transport segments, the data bypass the parity substituting part 73D, and the byte-symbol converter 73E receives the bypassed data.

The byte-symbol converter 73E performs the byte-symbol converting, and the supplemental data symbol processor 74 performs the processes described earlier using FIG. 10. That is, if the input symbol is a supplemental data symbol, the supplemental data symbol processor 74 enables the information bit of the supplemental data to bypass the precoder of the existing 8T-VSB transmitter 75 and encodes the information bit using the ½ rate convolutional encoder. Then the encoded data is multiplexed with a predefined sequence, and the information bit and the multiplexed data are inputted as an upper input bit and a lower input bit, respectively, to both the symbol-byte converter 73F and the trellis encoder 75A.

The trellis encoder 75A includes a precoder and a trellis encoder as shown in FIG. 10. It precodes the upper input bit and performs the trellis encoding process on the lower input bit. Then the precoded data, upper input bit, and encoded data are inputted to the 8T-VSB modulator.

On the other hand, the symbol-byte converter 73F of the first encoding part 73 performs the symbol-byte converting process and outputs the converted data to the nonsystematic Read-Solomon encoder 73G. The nonsystematic Read-Solomon encoder 73G encodes the 187 information bytes of the supplemental data segment to generate 20 parity bytes to the parity substituting part 73D based on the second and third control signals. Similarly, the second and third control signals represent a supplemental data byte indicating signal and a supplemental data parity indicating signal.

Figure 12:
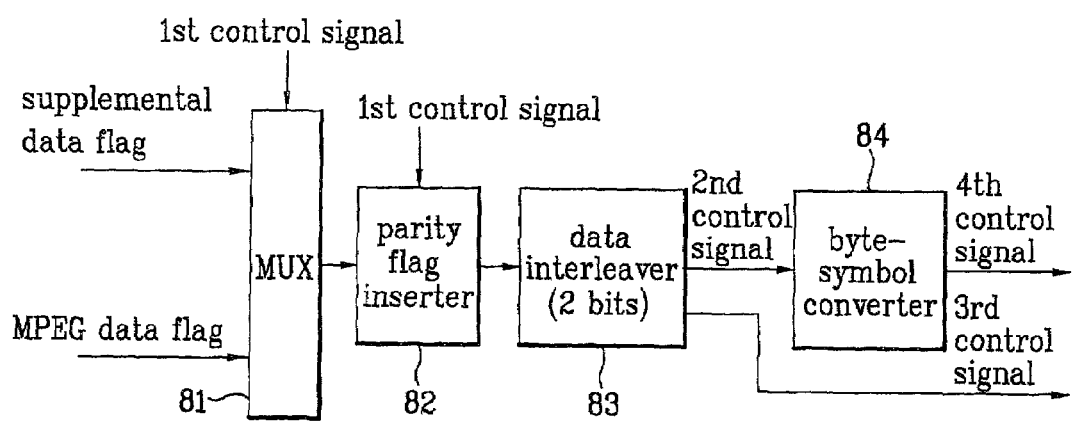
FIG. 12 illustrates a control signal generator that generates second, third, and fourth control signals based on a first control signal.

FIG. 12 illustrates a control signal generator generating the second, third, and fourth control signals based on the first control signal. The first control signal being inputted to the multiplexer 81 indicates whether the segment being multiplexed in the multiplexer 81 is a supplemental data segment or an MPEG transport segment. In other words, the multiplexer 81 multiplexes the flag (3 "00"s and 184 "10"s) corresponding to the supplemental data segment and the another flag (187 "00"s) corresponding to the MPEG transport segment and transmits the multiplexed flag to the parity flag inserter 82. The parity flag inserter 82 performs a function similar to the Read-Solomon encoder/parity place holder inserter 73B shown in FIG. 11. It inserts "01" in the locations wherein the Read-Solomon parity is inserted for the supplemental data segment. Or it inserts "00" for the MPEG transport data segment. Thereafter, the data interleaver 83 interleaves the data so that the orders of the flags are changed. The interleaver 83 performs a function similar to the data interleaver shown in FIG. 11, and it generates the second and third control signals.

The upper bit and lower bit of the 2 bits of the flag outputted from the data interleaver 83 becomes the second and third control signals, respectively. The second control signal indicates whether the data outputted from the data interleaver 83 are supplemental data, and the third control signal indicates whether the data outputted fro the data interleaver 83 are the parity place holders of the supplemental data segments or not. The byte-symbol converter 84, which acts similar to the byte-symbol converter 73E of FIG. 11, generates the fourth control signal after receiving the second control signal from the data interleaver 83. The fourth control signal indicates whether the input symbol is a supplemental data symbol.

Figure 13:
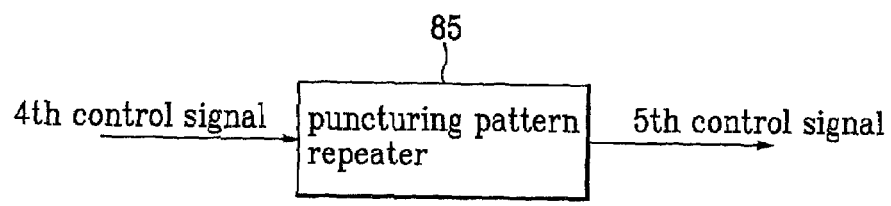
FIG. 13 illustrates a puncturing pattern generator that generates a fifth control signal based on the fourth control signal.

FIG. 13 is a block diagram illustrating a puncturing pattern repeater that receives the fourth control signal and generate a fifth control signal. The fifth control signal is used in the supplemental data symbol processor 74 shown in FIG. 11 as a puncturing control signal. The puncturing pattern repeater 85 receives the fourth control signal and generates the fifth control signal by repeating a given puncturing pattern only for the section corresponding to the supplemental data symbol in the fourth control signal. A total of twelve puncturing pattern repeaters are used for each supplemental data symbol processor of the system. The information related to the puncturing pattern is added to the multiplexing information being transmitted using the reserved region of the field sync signal.

According to the VSB transmission system shown in FIG. 11, a predefined sequence can be transmitted for each symbol if the puncturing signal includes only "0". This will greatly improve the robustness of the system against the channel ghost.

As described above, the digital VSB transmission system according to the present invention achieves the following advantages. First, the system can transmit the supplemental data together with the MPEG data using an existing digital broadcasting channel while still being compatible with the existing ATSC-8T VSB receivers. Second, it has a greater robustness against the channel ghost and noise signals compared to the existing ATSC 8T-VSB transmission system. Third, it achieves a greater coding gain of the supplemental data compared to the digital VSB transmission system that transmits the predefined sequence only. Fourth, it has a greater robustness against the channel ghost and noise signals compared to the VSB transmission system that only includes the convolutional encoding. Finally, since the supplemental data symbol bypasses the input supplemental data symbol, it achieves an even greater robustness against the channel ghost and noise signals.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A digital vestigial sideband (VSB) transmission system comprising:
   a supplemental data processor receiving input supplemental data and inserting systematic Read-Solomon parity bytes, a first predefined sequence, and an MPEG header into said input supplemental data;
   a first multiplexer multiplexing MPEG data with said input supplemental data processed in said supplemental data processor to generate a set of data segments, each of which is any one of a supplemental data segment and an MPEG data segment;
   a first encoding part generating a supplemental data symbol for each supplemental data segment by initially relocating said systematic parity bytes to be placed after information bytes for each supplemental data segment and substituting nonsystematic parity bytes for said relocated systematic parity bytes;
   a supplemental data symbol processor generating first and second data bits for each supplemental data symbol, said first data bit being generated by post-decoding an information bit of each supplemental data symbol, said second data bit being generated by encoding said information bit with a ½ coding rate and multiplexing said encoded information bit with said first predefined sequence; and
   a VSB transmitter processing said data bits generated in said supplemental data symbol processor including trellis encoding and VSB modulating and subsequently transmitting said modulated data to a receiving side.

2. The VSB transmission system of claim 1, wherein said first encoding part includes:
   a data randomizer randomizing each supplemental data segment generated in said first multiplexer;
   a parity place holder inserter determining a parity place holder and inserting null bytes into parity places determined by said holder for each supplemental data segment randomized in said data randomizer;
   a data interleaver interleaving said each supplemental data segment processed in said parity place holder inserter so that said systematic parity bytes are placed after said information bytes;
   a parity substituting part substituting said nonsystematic parity bytes for said null bytes for each supplemental data segment interleaved in said data interleaver;
   a byte-symbol converter converting each supplemental data segment processed in said parity substituting part into said supplemental data symbol;
   a symbol-byte converter converting said supplemental data symbol for each supplemental data segment into corresponding bytes; and
   a nonsystematic Read-Solomon encoder performing a nonsystematic Read-Solomon encoding process on said data converted in said symbol-byte converter in order to provide said nonsystematic parity bytes to said parity substituting part for each supplemental data segment.

3. The VSB transmission system of claim 2, wherein said parity place holder inserter determines said parity places by initially determining said parity place holder, inserting said null bytes into said determined parity places, and inserting said information bytes in all other places for each supplemental data segment randomized in said data randomizer.

4. The VSB transmission system of claim 3, wherein said parity places are determined by the following equation:

$b=((52 \times p)+(s\,mod\,52))\,mod\,207,$ for p=187, 188, ..., 206,
where s represents a segment number (0–311) of each supplemental data segment; and b represents each of said parity places (0–206) for each supplemental data segment.

5. The VSB transmission system of claim 4, wherein said parity place holder inserts first three bytes of said information bytes as first three bytes of each supplemental data segment regardless of said determined parity places and inserts all other information bytes into non-parity places for each supplemental data segment if said segment number s is any one of 1–7, 53–59, 105–111, 157–163, 209–215, and 261–167.

6. The VSB transmission system of claim 2, wherein said nonsystematic Read-Solomon encoder uses a generator matrix corresponding to said determined parity place holder of each supplemental data segment.

7. The VSB transmission system of claim 1, wherein said supplemental data symbol processor includes:
a precoder-bypassing part post-decoding said information bit of each supplemental data symbol to generate said first data bit;
a ½ rate convolutional encoder encoding said information bit of each supplemental data symbol with said ½ coding rate; and
a second multiplexer multiplexing said encoded information bit of each supplemental data symbol with said first predefined sequence to generate said second data bit.

8. The VSB transmission system of claim 7, wherein said precoder-bypassing part includes:
a modified precoder having a second precoder and enabling said information bit of each supplemental data symbol to bypass said second precoder; and
a post-decoder post-decoding said information bit bypassed in said modified precoder.

9. The VSB transmission system of claim 7, wherein said ½ rate convolutional encoder includes:
a first selecting element selecting a previous second register value for each supplemental data symbol;
a first register storing said value selected by said first selecting element;
an adder adding said value stored in said first register and said information bit of each supplemental data symbol;
a second selecting element selecting said value added by said adder for each supplemental data symbol;
a second register storing said value selected by said second selecting element; and
a third selecting element selecting said value stored in said second register for each supplemental data symbol, wherein said previous second register value is a value previously stored in said second register.

10. The VSB transmission system of claim 1, wherein said first encoding part generates an MPEG data symbol for each MPEG data segment by carrying out processes on each MPEG data segment generated by said first multiplexer including data randomizing, Read-Solomon encoding, data interleaving, and byte-symbol converting.

11. The VSB transmission system of claim 10, wherein said supplemental data symbol processor generates third and fourth data bits for each MPEG data symbol generated in said first encoding part, said third data bit being generated by preceding and post-decoding an information bit of each MPEG data symbol, said fourth data bit being a second predefined sequence included in each MPEG data symbol.

12. The VSB transmission system of claim 11, wherein said first encoding part includes:
a data randomizer randomizing each MEPG data segment generated in said first multiplexer;
a Read-Solomon encoder encoding each MPEG data segment randomized in said data randomizer;
a data interleaver interleaving each MPEG data segment encoded in said Read-Solomon encoder; and
a byte-symbol converter converting each MPEG data segment interleaved in said data interleaver into said MEPG data symbol.

13. The VSB transmission system of claim 11, wherein said supplemental data symbol processor includes:
a precoder-bypassing part generating said third data bit by preceding and post-decoding said information bit of each MPEG data symbol;
a ½ rate convolutional encoder outputting said second predefined sequence; and
a second multiplexer generating said fourth data bit by outputting said second predefined sequence included in each MPEG data symbol.

14. The VSB transmission system of claim 13, wherein said precoder-bypassing part includes:
a modified precoder preceding said information bit of each MPEG data symbol; and
a post-decoder post-decoding said information bit of each MPEG data symbol precoded in said modified precoder.

15. The VBS transmission system of claim 13, wherein said ½ rate convolutional encoder includes:
a first selecting element selecting a previous first register value for each MPEG data symbol;
a first register storing said value selected by said first selecting element for each MPEG data symbol;
an adder adding said value stored in said first register and said information bit of each MPEG data symbol;
a second selecting element selecting a previous second register value for each MPEG data symbol;
a second register storing said value selected by said second selecting element for each MPEG data symbol; and
a third selecting element selecting said predefined sequence for each MPEG data symbol, wherein said previous first and second register values are values previously stored in said first and second registers, respectively.

16. A digital vestigial sideband (VSB) transmission system comprising:
a precoder-bypassing part generating a first data bit by post-decoding an information bit of a supplemental data symbol;
a ½ rate convolutional encoder encoding said information bit with a ½ coding rate;
a multiplexer selecting said encoded information bit as a second data bit;
a first precoder generating a third data bit by preceding said first data bit;
a trellis encoder generating a fourth data bit by directly outputting said second data bit and generating a fifth data bit by trellis-encoding said second data bit; and
a VSB modulator generating a modulation value based on said third, fourth, and fifth data bits received from said first precoder and trellis encoder.

17. The VSB transmission system of claim 16, wherein said precoder-bypassing part includes:
- a modified precoder having a second precoder and enabling said information bit to bypass said second precoder; and
- a post-decoder post-decoding said information bit bypassed in said modified precoder.

18. The VSB transmission system of claim 16, wherein said ½ rate convolutional encoder includes:
- a first selecting element selecting a previous second register value for said supplemental data symbol received;
- a first register storing said value selected by said first selecting element;
- an adder adding said value stored in said first register and said information bit of said supplemental data symbol;
- a second selecting element selecting said value added by said adder;
- a second register storing said value selected by said second selecting element; and
- a third selecting element selecting said value stored in said second register, wherein said previous second register value is a value previously stored in said second register.

19. The VSB transmission system of claim 16, wherein said encoding part generates an MPEG data symbol for each MPEG data segment by carrying out processes on each MPEG data segment generated by said first multiplexer including data randomizing, Read-Solomon encoding, data interleaving, and byte-symbol converting.

20. The VSB transmission system of claim 19, wherein said supplemental data symbol processor generates third and fourth data bits for each MPEG data symbol generated in said first encoding part, said third data bit being generated by preceding and post-decoding an information bit of each MPEG data symbol, said fourth data bit being a second predefined sequence included in each MPEG data symbol.

21. A Vestigial Sideband (VSB) receiving system for receiving and transmitting digital broadcasting signals, said receiving system comprising:
- a supplemental data processor receiving input supplemental data and inserting systematic Read-Solomon parity bytes, a first predefined sequence, and an MPEG header into said input supplemental data;
- a first multiplexer multiplexing MPEG data with said input supplemental data processed in said supplemental data processor to generate a set of data segments, each of which is any one of a supplemental data segment and an MPEG data segment;
- a first encoding part generating a supplemental data symbol for each supplemental data segment by initially relocating said systematic parity bytes to be placed after information bytes for each supplemental data segment and substituting nonsystematic parity bytes for said relocated systematic parity bytes;
- a supplemental data symbol processor generating first and second data bits for each supplemental data symbol, said first data bit being generated by post-decoding an information bit of each supplemental data symbol, said second data bit being generated by encoding said information bit with a ½ coding rate and multiplexing said encoded information bit with said first predefined sequence; and
- a VSB transmitter processing said data bits generated in said supplemental data symbol processor including trellis encoding and VSB modulating and subsequently transmitting said modulated data to a receiving side.

22. The VSB transmission system of claim 21, wherein said first encoding part includes:
- a data randomizer randomizing each supplemental data segment generated in said first multiplexer;
- a parity place holder inserter determining a parity place holder and inserting null bytes into parity places determined by said holder for each supplemental data segment randomized in said data randomizer;
- a data interleaver interleaving said each supplemental data segment processed in said parity place holder inserter so that said systematic parity bytes are placed after said information bytes;
- a parity substituting part substituting said nonsystematic parity bytes for said null bytes for each supplemental data segment interleaved in said data interleaver;
- a byte-symbol converter converting each supplemental data segment processed in said parity substituting part into said supplemental data symbol;
- a symbol-byte converter converting said supplemental data symbol for each supplemental data segment into corresponding bytes; and
- a nonsystematic Read-Solomon encoder performing a nonsystematic Read-Solomon encoding process on said data converted in said symbol-byte converter in order to provide said nonsystematic parity bytes to said parity substituting part for each supplemental data segment.

23. The VSB transmission system of claim 22, wherein said parity place holder inserter determines said parity places by initially determining said parity place holder, inserting said null bytes into said determined parity places, and inserting said information bytes in all other places for each supplemental data segment randomized in said data randomizer.

24. The VSB transmission system of claim 23, wherein said parity places are determined by the following equation:

$$b=((52 \times p)+(s \bmod 52)) \bmod 207,$$

for p=187, 188, . . . , 206,
where s represents a segment number (0–311) of each supplemental data segment; and b represents each of said parity places (0–206) for each supplemental data segment.

25. The VSB transmission system of claim 24, wherein said parity place holder inserts first three bytes of said information bytes as first three bytes of each supplemental data segment regardless of said determined parity places and inserts all other information bytes into non-parity places for each supplemental data segment if said segment number s is any one of 1–7, 53–59, 105–111, 157–163, 209–215, and 261–167.

26. The VSB transmission system of claim 22, wherein said nonsystematic Read-Solomon encoder uses a generator matrix corresponding to said determined parity place holder of each supplemental data segment.

27. The VSB transmission system of claim 21, wherein said supplemental data symbol processor includes:
- a precoder-bypassing part post-decoding said information bit of each supplemental data symbol to generate said first data bit;
- a ½ rate convolutional encoder encoding said information bit of each supplemental data symbol with said ½ coding rate; and
- a second multiplexer multiplexing said encoded information bit of each supplemental data symbol with said first predefined sequence to generate said second data bit.

28. The VSB transmission system of claim 27, wherein said precoder-bypassing part includes:
- a modified precoder having a second precoder and enabling said information bit of each supplemental data symbol to bypass said second precoder; and
- a post-decoder post-decoding said information bit bypassed in said modified precoder.

29. The VSB transmission system of claim 27, wherein said ½ rate convolutional encoder includes:
- a first selecting element selecting a previous second register value for each supplemental data symbol;
- a first register storing said value selected by said first selecting element;
- an adder adding said value stored in said first register and said information bit of each supplemental data symbol;
- a second selecting element selecting said value added by said adder for each supplemental data symbol;
- a second register storing said value selected by said second selecting element; and
- a third selecting element selecting said value stored in said second register for each supplemental data symbol, wherein said previous second register value is a value previously stored in said second register.

* * * * *